US009908221B1

(12) United States Patent
Czaplewski et al.

(10) Patent No.: US 9,908,221 B1
(45) Date of Patent: Mar. 6, 2018

(54) TOOLS WITH ENGAGEMENT SENSORS AND INDICATORS

(71) Applicant: International Business Machines Corporation, Armonk, NY (US)

(72) Inventors: Sarah K. Czaplewski, Rochester, MN (US); Lee Helgeson, Rochester, MN (US); Jonathan L. Kaus, Rochester, MN (US); Pamela L. Lembke, West Lafayette, IN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/465,067

(22) Filed: Mar. 21, 2017

(51) Int. Cl.
| B25B 23/16 | (2006.01) |
| G01L 1/16 | (2006.01) |
| G01L 5/00 | (2006.01) |
| B25B 7/00 | (2006.01) |
| G08B 21/18 | (2006.01) |
| B25B 13/48 | (2006.01) |

(52) U.S. Cl.
CPC .............. *B25B 23/16* (2013.01); *B25B 7/00* (2013.01); *G01L 1/16* (2013.01); *G01L 5/0038* (2013.01); *G01L 5/0042* (2013.01); *G08B 21/182* (2013.01); *B25B 13/48* (2013.01); *B25B 13/481* (2013.01)

(58) Field of Classification Search
CPC .......... B25B 23/16; B25B 7/00; B25B 13/48; B25B 13/481; G01L 1/16; G01L 5/0038; G01L 5/0042; G08B 21/182; E21B 19/16
See application file for complete search history.

(56) References Cited

U.S. PATENT DOCUMENTS 5,484,026 A * 1/1996 Susaki ................... B25B 21/00
                                                                  173/11
7,311,027 B1 * 12/2007 Tatsuno .................. B25B 21/00
                                                                 173/176

(Continued)

FOREIGN PATENT DOCUMENTS

| WO | 02097386 A1 | 5/2002 |
| WO | 2007063106 A1 | 6/2007 |
| WO | 2009110057 A1 | 9/2009 |

OTHER PUBLICATIONS

Schlegl, Thomas, et al.,"Fast dextrous re-grasping with optimal contact forces and contact sensor-based impedance control", Robotics and Automation, 2001. Proceedings 2001 ICRA. IEEE International Conference on. vol. 1. IEEE, 2001.

*Primary Examiner* — Larry E Waggle, Jr.
*Assistant Examiner* — Danny Hong
(74) *Attorney, Agent, or Firm* — Patterson + Sheridan, LLP (57) ABSTRACT

A tool with an electrical circuit to provide indications whether the tool is properly engaged with a fastener or other workpiece is provided. The tool includes a handle and an end effector configured to engage the fastener or workpiece. The end effector includes sensors arranged on surfaces of the end effector that contact the fastener or workpiece when the end effector is properly engaged with the fastener or workpiece. The sensors are electrically connected to an indicator via an electrical circuit. The electrical circuit causes the indicator to output different indications depending on whether none, some, or all of the sensors are in contact.

20 Claims, 3 Drawing Sheets

(56) References Cited

U.S. PATENT DOCUMENTS

| | | | | |
|---|---|---|---|---|
| 8,418,778 | B2* | 4/2013 | Eshleman | ............... B25B 21/00 173/1 |
| 8,905,153 | B2* | 12/2014 | Braun | .................. B25D 16/003 173/4 |
| 2002/0144832 | A1* | 10/2002 | Brandstrom | ............ B25B 21/00 174/36 |
| 2004/0115014 | A1 | 6/2004 | Totsu | |
| 2010/0326242 | A1 | 12/2010 | Miyamoto | |
| 2013/0000938 | A1* | 1/2013 | Matsunaga | ........... B25B 21/008 173/181 |
| 2014/0166326 | A1* | 6/2014 | Le Du | .................... B25B 21/02 173/181 |
| 2015/0014005 | A1 | 1/2015 | Puzio et al. | |
| 2016/0225247 | A1 | 8/2016 | Hita | |

\* cited by examiner

TOOLS WITH ENGAGEMENT SENSORS AND INDICATORS

BACKGROUND

In some scenarios, tools such as screwdrivers are used in blind locations where the operator of the tool cannot see the fastener or other work piece the tool is supposed to engage. For example, heatsinks are sometimes secured to computer processors (e.g., CPUs or GPU's) using screws, and the screws are located in holes that are deep enough that a person using a screwdriver cannot see the distal end of the screwdriver that is supposed to engage the screw. Misalignment between the screw and the screwdriver could damage the circuit board or other electronics in two ways. First, if the screwdriver misses the screw, then the screwdriver could be twisted against a circuit board or other electronics, causing mechanical damage such as scratches or gouges that may affect the operability of the circuit board or other electronics. Second, if the screwdriver is not properly engaged with the screw, then the screwdriver may strip a portion of the screw, causing shavings that may land on the circuit board or other electronics. Such shavings could potentially cause a short circuit on the circuit board or other electronics.

SUMMARY

According to one embodiment of the present invention, a screwdriver comprises a handle and a shaft extending from the handle. The shaft defines an end effector that includes end effector features configured to engage corresponding features of a workpiece. The end effector comprises a first flat surface and an opposing second flat surface that are outwardly facing relative to an axis of the shaft and a distal end of the shaft disposed between the first flat surface and the second flat surface. The screwdriver also comprises a plurality of sensors disposed on respective end effector features. The plurality of sensors comprises a first sensor disposed on the distal end of the shaft, a second sensor disposed on the first flat surface, and a third sensor disposed on the second flat surface. The first, second, and third sensors are operable to detect contact with an exterior surface. The screwdriver also comprises an indicator operable to output at least a first indication, a second indication, and a third indication. The screwdriver also comprises an electrical circuit in communication with the indicator and the plurality of sensors. The electrical circuit is operable to cause the indicator to output the first indication if none of the plurality of sensors detect contact with an exterior surface. The electrical circuit is further operable to cause the indicator to output the second indication if at least one but not all of the plurality of sensors detect contact with an exterior surface. The electrical circuit is further operable to cause the indicator to output the third indication if all of the plurality of sensors detect contact with an exterior surface.

According to one embodiment of the present invention, a tool comprises a handle and an end effector extending from the handle. The end effector is configured to engage and manipulate a workpiece and includes a plurality of effector features. The tool also comprises a plurality of sensors disposed on respective ones of the plurality of effector features. The sensors include a first sensor arranged on a first one of the plurality of the effector features, a second sensor arranged on a second one of the plurality of the effector features, and a third sensor arranged on a third one of the plurality of the effector features. The tool also comprises an indicator operable to output a first indication, a second indication, and a third indication. The tool also comprises an electrical circuit in communication with the indicator and the plurality of sensors. The electrical circuit is operable to cause the indicator to output the first indication if none of the plurality of sensors detect contact with an exterior surface. The electrical circuit is further operable to cause the indicator to output the first indication if at least one but not all of the plurality of sensors detect contact with an exterior surface. The electrical circuit is further operable to cause the indicator to output the first indication if all of the plurality of sensors detect contact with an exterior surface.

DETAILED DESCRIPTION

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" or "the disclosure" shall not be construed as a generalization of any inventive subject matter disclosed herein and shall not be considered to be an element or limitation of the appended claims except where explicitly recited in a claim(s).

In embodiments described herein, a screwdriver or other tool is provided with contact sensors that detect contact with a fastener or other structure the tool is supposed to engage. The contact sensors are disposed on the tool in a manner that the tool is properly positioned with respect to the fastener or other structure when all of the contact sensors detect contact. The contact sensors are connected to an electrical circuit that outputs various indications based on whether none of the contact sensors, some of the contact sensors, or all of the contact sensors are detecting contact. For example, the indications could be provided by light emitting diodes that emit different colors for the different respective indications. As another example, the indications could be provided by an acoustic transducer that is operable to admit different audible tones for the different respective indications. As another example, the indications could be provided by a haptic actuator that provides different haptic signals (e.g., vibrations) for the different respective indications. By providing the indications, a user of the tool may be confident that the tool is properly engaged with the fastener or other intended workpiece before applying torque or other force to the tool, thereby avoiding unintentional damage.

Figure 1A:
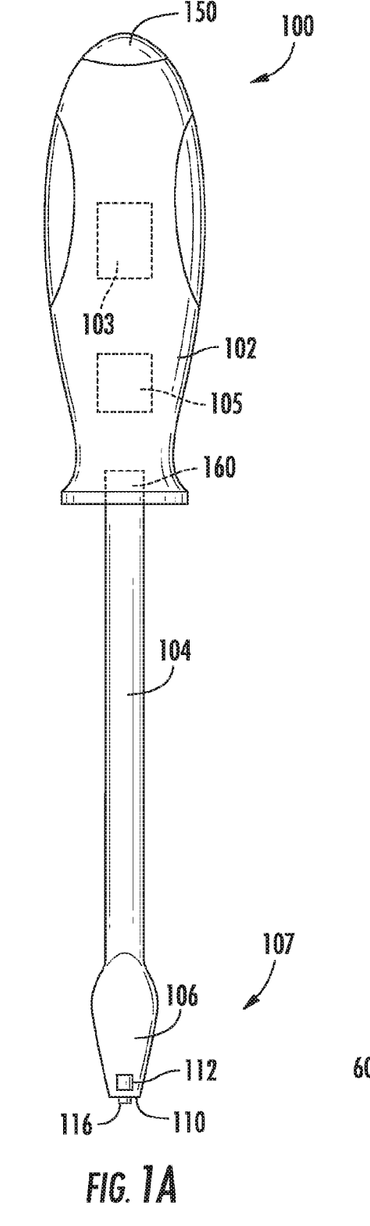
FIG. 1A is a side view of a screwdriver according to one embodiment.
Figure 1B:
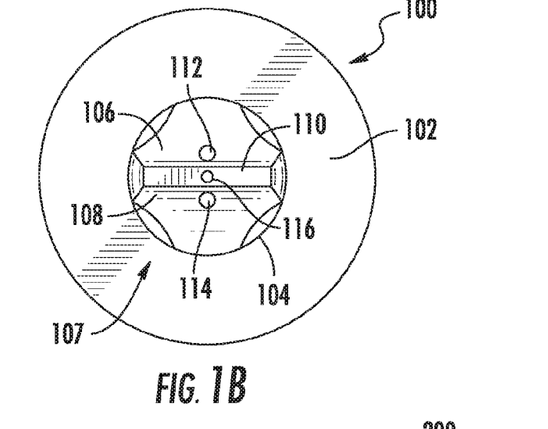
FIG. 1B is an end view of the screwdriver of FIG. 1A.

FIGS. 1A and 1B are a side view and an end view, respectively, of a screwdriver 100 according to one embodiment. The screwdriver 100 includes a handle 102 and a shaft 104 extending from the handle. The illustrated screwdriver 100 has a "flathead" end effector 107 that includes features, such as a first flat surface 106 and an opposing second flat surface 108 that are outwardly-facing relative to an axis of the shaft 104. The first flat surface 106 and the opposing second flat surface 108 engage a slot in a screw. The screwdriver 100 includes a first sensor 116 disposed on a distal end 110 of the shaft 104, a second sensor 112 disposed on the first flat surface 106, and a third sensor 114 disposed on the second flat surface 108.

The first sensor 116, the second sensor 112, and the third sensor 114 are operable to detect contact with an exterior surface, such as surfaces within the slot of a screw. Moreover, the first sensor 116, the second sensor 112, and the third sensor 114 are disposed on the distal end 110 of the shaft 104 and on the flat surfaces 106 and 108 such that all three sensors 116, 112, and 114 make contact with surfaces of a screw when the screwdriver 100 is properly engaged with the screw. For example, when the illustrated "flathead" screwdriver 100 is properly engaged with a screw, the first sensor 116 disposed on the distal end 110 of the shaft 104 will contact a bottom of a screwdriver slot on the head of a screw, the second sensor 112 disposed on the first flat surface 106 of the screwdriver 100 will contact a first side wall of the slot on the head of the screw, and the third sensor 114 disposed on the second flat surface 108 of the screwdriver 100 will contact an opposing second side wall of the slot on the head of the screw. If any of the sensors 116, 112, and 114 do not detect contact with the screw, then the screwdriver 100 is not properly engaged with the screw. For example, consider a scenario in which the first sensor 116 on the distal end 110 of the shaft 104 detects contact but the second and third sensors 112 and 114 do not detect contact. In such a scenario, the distal end 110 of the shaft 104 may be contacting the screw at a location away from the slot on the head of the screw. Alternatively, the distal end 110 of the shaft 104 may be contacting some other surface, such as a surface of the circuit board or other electrical component. As another example, consider a scenario in which the second and third sensors 112 and 114 detect contact, but the first sensor 116 on the distal end 110 of the shaft 104 does not detect contact. In such a scenario, the flat surfaces 106 and 108 of the shaft 104 may be engaged with the slot of the screw, but the distal end 110 of the screwdriver 100 is not fully inserted into the slot. In such a position, reduced contact between the flat surfaces 106 108 of the shaft 108 and the slot of the screw may result in the screwdriver 100 "stripping" the head of the screw, resulting in metal shavings that could short-circuit a circuit board or other electrical component.

Figure 6:
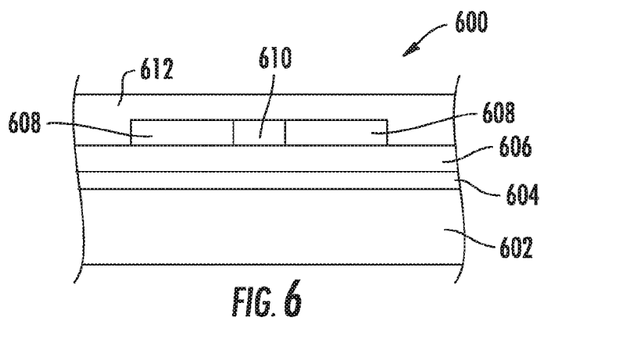
FIG. 6 is a cross-sectional side view of a thin-film capacitive sensor, according to one embodiment.

In at least one embodiment, the contact sensors comprise capacitive/resistive sensors, such as thin film capacitive sensors. FIG. 6 is a cross-sectional side view of an exemplary thin-film capacitive sensor 600. The thin-film capacitive sensor 600 is mounted to a substrate 602. In the case of the screwdriver 100, the substrate 602 is the distal end 110, the first flat surface 106, or the second flat surface 108. The thin-film capacitive sensor 600, in this embodiment, includes an intermediate film 604 disposed on the substrate 602, an isolation film 606 disposed on the intermediate film 604, a lead film 608 and sensitive film 610 disposed on the isolation film 606, and a protective film 612 disposed on the lead film 608 and sensitive film 610. In various embodiments, the intermediate film 604 is Chromium or a Nickel Chromium alloy and has a thickness of between 0.1 and 0.8 micrometers. The intermediate film 604 increases the adhesive strength between the substrate 602 and the isolation film 606. In various embodiments, the isolation film 606 is Silicon Dioxide ($SiO_2$) and has a thickness between 1.5 and 2.5 micrometers. In one embodiment, the thickness of the isolation film 606 is approximately 2.4 micrometers. In various embodiments, the lead film 608 and the sensitive film 610 are made of a Copper-Manganese-Nickel alloy and have a thickness between 0.15 and 0.3 micrometers. In various embodiments, the protective film 612 is made of $SiO_2$ and has a thickness of between 1.5 and 2.5 micrometers. In one embodiment, the thickness of the protective film 612 is approximately 2.4 micrometers. The protective film 612 protects the lead film 608 and the sensitive film 610 from damage. In use, the lead film 608 is connected to an electrical circuit (e.g., a Wheatstone bridged circuit), and pressure applied to the thin-film capacitive sensor is measured by measuring changes to voltages and/or currents in the electrical circuit.

In at least one other embodiment, the contact sensors comprise piezoelectric sensors. The piezoelectric sensors comprise a piezoelectric transducer connected to an electrical circuit that detects voltage and/or current changes from the piezoelectric transducer. In various embodiments, the piezoelectric transducer may be made of Quartz, Topaz, Berlinite, or Lead titanate ($PbTiO_3$).

In at least one other embodiment, the contact sensors comprise electromechanical sensors. Such electromechanical sensors include two conductive contacts that are separated by a gap. Application of pressure urges the two conductive contacts toward each other and into contact such that the two conductive contacts close an electrical circuit.

The screwdriver 100 includes an electrical circuit 105 (described in greater detail below with reference to FIG. 5) that is in communication with an indicator 150. The indicator 150 is disposed on the screwdriver 100 at a location where indications output by the indicator 150 are observable by a person using the screwdriver 100. The indicator 150 on the exemplary screwdriver 100 is illustrated on a proximal end of the handle 102. In various other embodiments, the indicator 150 could be positioned elsewhere on the screwdriver 100.

As discussed above, when powered by a power supply 103 such as a battery, the indicator 150 outputs different indications to indicate whether none of the sensors, some of the sensors, or all of the sensors are in contact. When none of the contact sensors 116, 112, and 114 are in contact with a fastener, then the indicator 150 outputs a first indication. When at least one of the contacts but not all the contact sensors 116, 112, and 114 are in contact with the fastener, then the indicator 150 outputs a second indication. When all the sensors 116, 112, and 114 are in contact with the fastener, then the indicator 150 outputs a third indication.

In one embodiment, the indicator 150 is a light emitting diode module configured to emit at least three different colors. The light emitting diode module emits a first color as the first indication, a second color as the second indication, and a third color as the third indication. For example, in one embodiment, the light emitting diode module may output a red color for the first indication, a yellow color for the second indication, and a green color as the third indication.

In another embodiment, the indicator 150 is an acoustic transducer operable to emit audible tones. The acoustic transducer emits a first tone as the first indication, a second tone as the second indication, and a third tone as the third indication. For example, in one embodiment, the acoustic transducer may admit a relatively low frequency tone for the first indication, a relatively higher frequency tone for the second indication, and a relatively highest tone for the third indication.

In another embodiment, the indicator 150 is a haptic actuator operable to output haptic signals to the handle 102. The haptic actuator outputs a first haptic signal as the first indication, a second haptic signal as the second indication, and a third haptic signal as the third indication. For example, the haptic indicator may be an unbalanced mass mounted to an output shaft of an electric motor, such that rotation of the output shaft of the electric motor generates an oscillating force (e.g., vibration). Such an exemplary haptic indicator may operate the electric motor at different speeds to generate different vibrations and/or operate the electric motor in different pulsed patterns for the different indications.

In at least one embodiment, the screwdriver 100 includes an electronically actuatable clutch 160 disposed between the handle 102 and the shaft 104. The clutch is in communication with the electrical circuit 105 and is switchable between an engaged state and a disengaged state. In the disengaged state, the clutch 160 decouples the shaft 104 from the handle 102 such that the shaft 104 rotates about its axis freely relative to the shaft 102. In the engaged state, the clutch 160 connects the shaft 104 to the handle 102 such that the shaft 104 rotates about its axis with the shaft 102. The clutch 160 could include a solenoid or piezoelectric member that moves between the first position and a second position to switch between the engaged and disengaged states, respectively.

Figure 2:
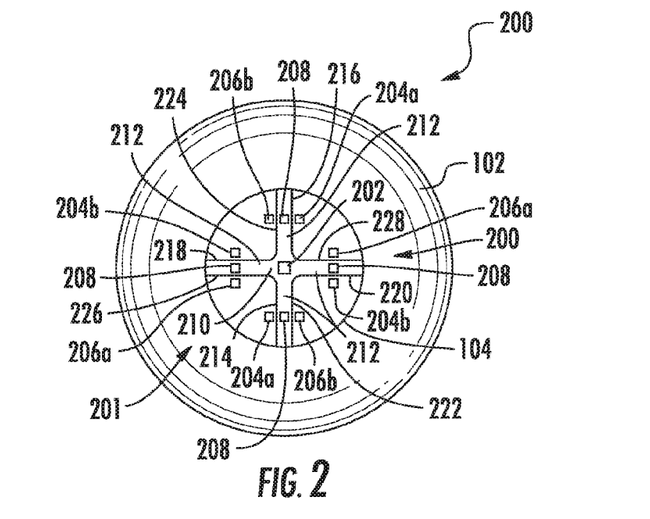
FIG. 2 is an end view of a different screwdriver according to one embodiment.

FIG. 2 is an end view of a screwdriver 200 with a Phillips head end effector 201. The Phillips head end effector 201 includes four edges 212 extending laterally from a distal end pointed tip 210 of the shaft 104. The four edges 212 are defined by eight flat surfaces extending therefrom. For example, one of the four edges 212 is defined by flat surfaces 214 and 222. A second of the four edges 212 is defined by flat surfaces 220 and 228. A third of the four edges 212 is defined by flat surfaces 216 and 224. A fourth of the four edges 212 is defined by flat surfaces 218 and 226. In use, the edges 212 are aligned with cross-shaped slots in the head of a Phillips head screw.

The distal end pointed tip 210 of the Phillips head end effector 201 includes a first sensor 202 thereon. At least two of the flat surfaces also include sensors. For example, flat surface 214 and flat surface 216 include sensors 204a. The three sensors 202 and 204a are sufficient to detect whether the Phillips head end effector 201 is properly engaged with a Phillips head screw because the three sensors 202 and 204a only make simultaneous contact with the screw if properly engaged. In various embodiments, the end effector 201 could include additional sensors. For example, the end effector 201 could include sensors 204b on flat surfaces 218 and 220. The end effector 201 could also include sensors 206a on surfaces 226 and 228. The end effector 201 could also include sensors 206b on surfaces 222 and 224. In various embodiments, the end effector 201 could also include sensors 208 on the edges 212.

The flat head screwdriver 100 and Philips head screwdriver 200 are merely examples of fastener drivers. In various embodiments, the above described sensors could be placed on other types of screwdrivers or other fastener drivers. For example, the above-described sensors could be used with a Torx® fastener, a Pozidriv® fastener, or an Allen head fastener.

Figure 3:
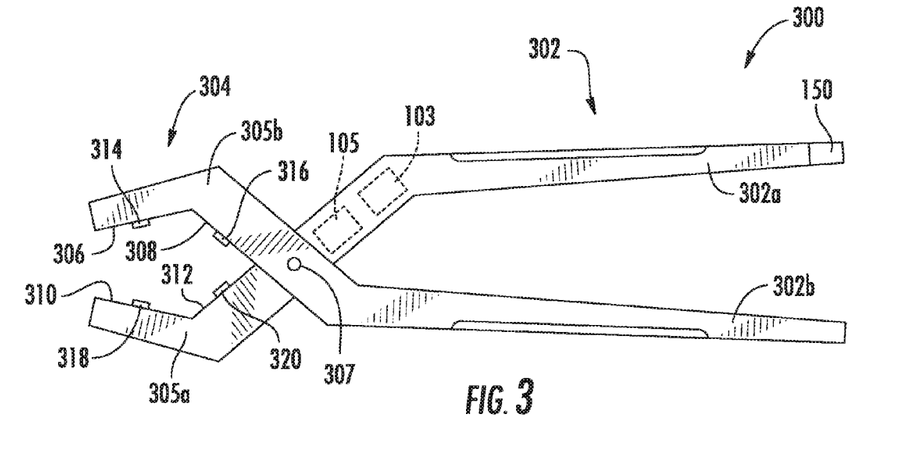
FIG. 3 is a side view of pliers according to one embodiment.

The above-described sensors can also be used with different types of tools in certain embodiments. FIG. 3 illustrates an embodiment for pliers 300. The pliers 300 have a handle 302 that includes a first handle grip 302a and a second handle grip 302b. The pliers 300 include an end effector 304 that includes a first jaw 305a attached to the first handle grip 302a and a second jaw 305b attached to the second handle grip 302b. The handle grips 302a and 302b and the first jaw 305a and the second jaw 305b rotate about a pivot 307 such that the jaws 305a and 305b can open and close. The end effector 304 includes a plurality of end effector features. For example, the first jaw 305a includes a first effector surface 310 and a second effector surface 312. As another example, the second jaw 305b includes a third effector surface 306 and a fourth effector surface 308. The effector surfaces 310, 312, 308, and 306 may be disposed on the first jaw 305a and the second jaw 305b to engage flat surfaces of a hex bolt, for example. The first effector surface 310 includes a first sensor 318 disposed thereon, the second effector surface 312 includes a second sensor 320 disposed thereon, the third effector surface 308 includes a third sensor 316 disposed thereon, and the fourth effector surface 306 includes a fourth sensor 314 disposed thereon. The handle 302 includes an indicator 150 that indicates whether the various sensors 318, 320, 316, 314 are all in contact with the hex bolt head or other fastener.

Figure 4:
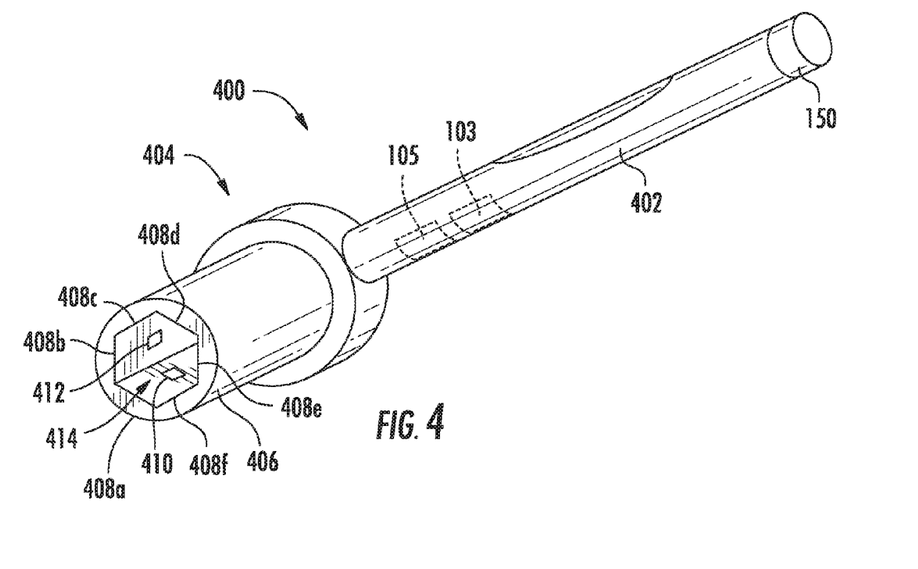
FIG. 4 is a perspective view of a socket wrench according to one embodiment.

FIG. 4 is a perspective view of a socket wrench 400 that includes a handle 404 and an end effector 404. The end effector 404 includes a socket 406 with a cavity 414 configured to receive a hexagonal bolt head. The socket 406 includes a plurality of end effector features, including a first recessed surface 408a in the cavity, a second recessed surface 408b in the cavity 414, a third recessed surface 408c in the cavity 414, a fourth recessed surface 408d in the cavity 414, a fifth recessed surface 408e in the cavity 414, and a sixth recessed surface 408f in the cavity 414. The first recessed surface 408a includes a first sensor 410 disposed thereon and the second recessed surface 408b includes a second sensor 412 disposed thereon. Although not visible in FIG. 4, the remaining recessed surfaces 408c, 408d, 408e, and 408f may also include sensors disposed thereon. The handle 402 includes an indicator 150 that is operable to provide indications of whether none, some, or all of the sensors are in contact with the fastener.

Figure 5:
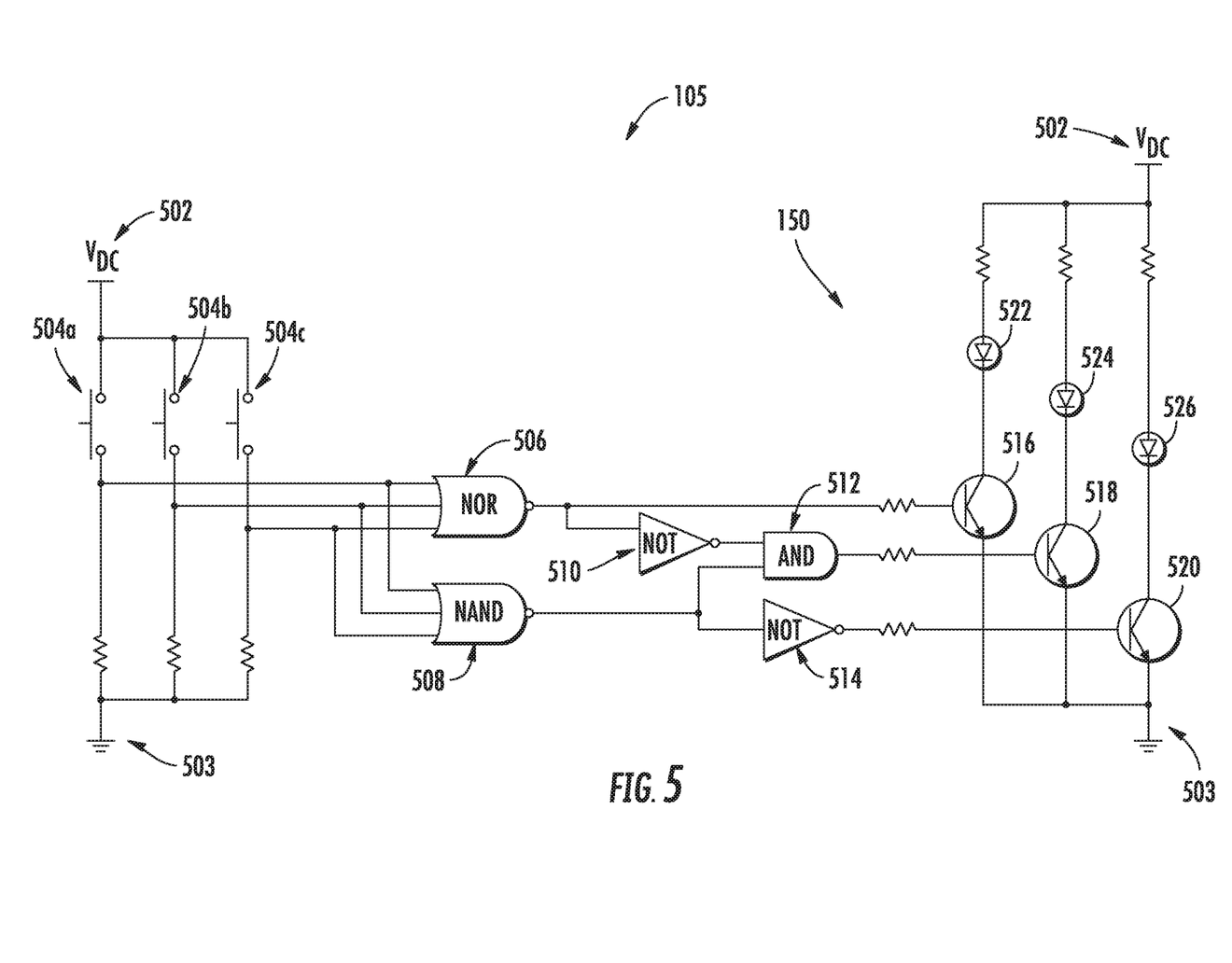
FIG. 5 is a circuit diagram for a circuit to energize indicators, according to one embodiment.

FIG. 5 is a circuit diagram that illustrates the electrical circuit 105 in accordance with one embodiment that outputs the different indications via the indicator 150. The electrical circuit 105 receives a direct current voltage 502 ($V_{DC}$) from the power source 103. The various sensors are connected in parallel between the direct current voltage source 502 and ground 503. In the exemplary electrical circuit 105 illustrated in FIG. 5, there are a total of three sensors: a first sensor 504a, a second sensor 504b, and a third sensor 504c. With respect to the screwdriver 100 in FIGS. 1A and 1B, the first sensor 504a, the second sensor 504b, and the third sensor 504c correspond to respective ones of the sensors 112, 114, and 116. In various other applications, there may be two sensors or more than three sensors. The sensors act as switches and are shown in an "open" state. When any of the sensors 504a, 504b, 504c are in contact with another surface (e.g., a surface of the fastener), the sensors switch to a closed state, thereby closing a circuit between the direct current voltage source 502 and ground 503.

In the electrical circuit 105, the three sensors 504a, 504b, and 504c are also connected to a NOT-OR (NOR) gate 506 and a NOT-AND (NAND) gate 508. The NOR gate 506 outputs a high voltage (e.g., voltage VDC 502) only if all of the input voltages from the sensors 504a, 504b, and 504c are low. Stated differently, if the three sensors 504a, 504b, and 504c are in the open state such that the three sensors 504a, 504b, and 504c are not passing the voltage $V_{DC}$ 502 to the inputs of the NOR gate 506, then the NOR gate 506 outputs a high voltage. If any of the sensors 504a, 504b, and 504c are in the closed state and therefore passing the voltage $V_{DC}$ 502 to an input of the NOR gate 506, then the NOR gate 506 outputs a low voltage (e.g., ground 503). The NAND gate 508 outputs a high voltage if any of the input voltages from the sensors 504a, 504b, and 504c is low. Stated differently, if at least one of the three sensors 504a, 504b, and 504c is in the open state such that the at least one sensor passes the ground voltage 503 to an input of the NAND gate 508, then the NAND gate 508 outputs a high voltage. By contrast, if all of the three sensors 504a, 504b, and 504c are in the closed state such that the all three sensors pass the voltage $V_{DC}$ 502, then the NAND gate 508 outputs a low voltage.

The electrical circuit uses different operations and/or combinations of the outputs from the NOR gate 506 and the NAND gate 508 to determine whether none, some, or all of the sensors 504a, 504b, 504c are making contact, and outputting a corresponding indication. The NOR gate 506 is connected to a first transistor 516 that is configured to close an electrical circuit for a first indicator 522 (e.g., a first colored LED). In the event that all three sensors 504a, 504b, and 504c are in the open state (i.e., not touching a fastener or other work piece), then the NOR gate 506 outputs the high voltage to the first transistor 516. The first transistor 516, in response to receiving the high voltage, closes a circuit that connects the first indicator 522 to the high voltage 502 and ground 503, causing the first indicator 522 to energize (e.g., illuminate).

The NAND gate 508 is connected to a second transistor 520 via a NOT gate 514. The second transistor is configured to close an electrical circuit for a second indicator 526 (e.g., a second color LED). The NOT gate 514 inverts the voltage output by the NAND gate 508 such that the voltage output by the NOT gate 514 is high (e.g., VDC 502) when the output by the NAND gate 508 is low (e.g., ground voltage 503) and vice versa. Therefore, when all three sensors 504a, 504b, and 504c are in the closed state and the NAND gate 508 outputs a low voltage, the NOT gate 514 outputs a high voltage. The second transistor 520, in response to receiving the high voltage from the NOT gate 514, closes a circuit that connects the second indicator 526 to the high voltage 502 and ground 503, causing the second indicator 526 to energize (e.g., illuminate).

A third transistor 518 is configured to close a circuit for a third indicator 524 (e.g., a third color LED). The third transistor 518 is connected to an output of an AND gate 512. The AND gate 512 outputs a high voltage if all of the input voltages are high and outputs a low voltage if any of the input voltages are low. A first input for the AND gate 512 is connected to the output of the NOR gate 506 via a NOT gate 510. A second input for the AND gate 512 is connected to the output of the NAND gate. As discussed above, the output voltage of the NOR gate 506 is low if any of the sensors 504a, 504b, and 504c are in the closed state. The NOT gate 510 inverts the low voltage output by the NOR gate 506 to a high voltage and vice versa. Also, as discussed above, the output voltage for the NAND gate 508 is high if any of the sensors 504a, 504b, and 504c are in the open state. Thus, the AND gate 512 outputs a high voltage if the NOR gate 506 (inverted via the NOT gate 510) indicates that at least one of the sensors 504a, 504b, and 504c is in the closed state and the NAND gate indicates that at least one of the sensors is in the open state. Stated differently, the AND gate 512 outputs a high voltage is some but not all of the sensors are in the closed state. The third transistor 518, in response to receiving the high voltage from the AND gate 512, closes a circuit that connects the third indicator 524 to the high voltage 502 and ground 503, causing the third indicator to energize (e.g., illuminate).

In the above-described electrical circuit 105, the first indicator 522, the second indicator 526, and the third indicator 524 are described as LEDs of an LED module. For example, in one embodiment, the first indicator 522 could be an LED that emits red light, the second indicator 526 could be an LED that emits green light, and the third indicator 524 could be an LED that emits yellow light. In such an embodiment, an indicator (e.g., indicator 150 of the screwdriver 100) would illuminate red if no sensors are in contact with a screw, illuminate yellow if some but not all of the sensors are in contact with the screw, and illuminate green if all of the sensors are in contact with a screw.

In various other embodiments, the LEDs 522, 526, and 524 in the electrical circuit 105 can be replaced with other electrical loads for different types of indicators. For example, in embodiments in which the indicator outputs sound, the indicators 522, 526, and 524 could be three separate acoustic transducers. Alternatively, the indicators 522, 526, and 524 could be different circuit components connected to an acoustic transducer, and the acoustic transducer is configured to output different sound frequencies when connected to the different respective circuit components. As another example, in embodiments in which the indicator is a haptic actuator, the indicators 522, 526, and 524 could be three separate electric motors configured to output different vibrations. Alternatively, the indicators 522, 526, and 524 could be different circuit components connected to an electric motor, and the electric motor is configured to operate at different speeds when connected to the different respective circuit components.

In embodiments that include an electronically-actuatable clutch (e.g., clutch 160), the electronic actuation mechanism could be electrically connected in series with the second indicator 526 such that the electronic actuator of the clutch 160 is energized when the second indicator 526 is energized. For example, if the electronic actuator of the clutch 160 is a solenoid, then the solenoid would be energized upon the second transistor 520 closing the circuit between $V_{DC}$ 502 and ground 526 that includes the second indicator 526.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing is directed to embodiments of the present disclosure, other and further embodiments of the invention may be devised without departing from the basic scope thereof, and the scope thereof is determined by the claims that follow.

What is claimed is:

1. A screwdriver, comprising:
   a handle;
   a shaft extending from the handle, the shaft defining an end effector that includes end effector features configured to engage corresponding features of a workpiece, the end effector comprising a first flat surface and an opposing second flat surface that are outwardly facing relative to an axis of the shaft and a distal end of the shaft disposed between the first flat surface and the second flat surface;
   a plurality of sensors disposed on respective end effector features, the plurality of sensors comprising:
      a first sensor disposed on the distal end of the shaft;
      a second sensor disposed on the first flat surface;
      a third sensor disposed on the second flat surface, wherein the first, second, and third sensors are operable to detect contact with an exterior surface;
   an indicator operable to output at least a first indication, a second indication, and a third indication; and
   an electrical circuit in communication with the indicator and the plurality of sensors, wherein the electrical circuit is operable to:
      cause the indicator to output the first indication if none of the plurality of sensors detect contact with an exterior surface;
      cause the indicator to output the second indication if at least one but not all of the plurality of sensors detect contact with an exterior surface; and
      cause the indicator to output the third indication if all of the plurality of sensors detect contact with an exterior surface.

2. The screwdriver of claim 1, wherein the indicator is a light emitting diode module configured to emit at least three different colors corresponding to the first indication, the second indication, and the third indication, respectively.

3. The screwdriver of claim 1, wherein the indicator is an acoustic transducer operable to emit audible tones, wherein the first indication is a first tone, wherein the second indication is a second tone, and wherein the third indication is a third tone.

4. The screwdriver of claim 1, wherein the indicator is a haptic actuator operable to output haptic signals to the handle, wherein the first indication is a first haptic signal, wherein the second indication is a second haptic signal, and wherein the third indication is a third haptic signal.

5. The screwdriver of claim 4, wherein the haptic signals are characterized by different frequencies.

6. The screwdriver of claim 1, wherein the plurality of sensors comprise at least one of electromechanical sensors, capacitive/resistive sensors, piezoelectric sensors, or optical sensors.

7. The screwdriver of claim 1, further comprising an electronically-actuatable clutch disposed between the handle and the shaft, wherein the clutch is in communication with the electrical circuit, wherein the clutch switches to a disengaged state when the indicator outputs the first indication or the second indication, and wherein the clutch switches to an engaged state when the indicator outputs the third indication.

8. The screwdriver of claim 1, further comprising:
   an edge extending between the first and second flat surfaces; wherein the plurality of sensors comprises a fourth sensor disposed on the edge.

9. The screwdriver of claim 1, further comprising a power supply operable to electrically power the electrical circuit, the indicator, and the sensors.

10. A tool, comprising:
    a handle;
    an end effector extending from the handle, wherein the end effector is configured to engage and manipulate a workpiece, the end effector including a plurality of effector features;
    a plurality of sensors disposed on respective ones of the plurality of effector features;
       a first sensor arranged on a first one of the plurality of the effector features;
       a second sensor arranged on a second one of the plurality of the effector features;
       a third sensor arranged on a third one of the plurality of the effector features;
    an indicator operable to output a first indication, a second indication, and a third indication; and
    an electrical circuit in communication with the indicator and the plurality of sensors, wherein the electrical circuit is operable to:
       cause the indicator to output the first indication if none of the plurality of sensors detect contact with an exterior surface;
       cause the indicator to output the first indication if at least one but not all of the plurality of sensors detect contact with an exterior surface; and
       cause the indicator to output the first indication if all of the plurality of sensors detect contact with an exterior surface.

11. The tool of claim 10, wherein the indicator is a light emitting diode module configured to emit at least three different colors corresponding to the first indication, the second indication, and the third indication, respectively.

12. The tool of claim 10, wherein the indicator is an acoustic transducer operable to emit audible tones, wherein the first indication is a first tone, wherein the second indication is a second tone, and wherein the third indication is a third tone.

13. The tool of claim 10, wherein the indicator is a haptic actuator operable to output haptic signals to the handle, wherein the first indication is a first haptic signal, wherein the second indication is a second haptic signal, and wherein the third indication is a third haptic signal.

14. The tool of claim 13, wherein the haptic signals are characterized by different frequencies.

15. The tool of claim 10, wherein the plurality of sensors comprise at least one of electromechanical sensors, capacitive/resistive sensors, piezoelectric sensors, or optical sensors.

16. The tool of claim 10, wherein the end effector comprises a socket wrench, wherein a first effector feature comprises a first recessed surface in a cavity of the socket wrench, and wherein a second effector feature comprises a second recessed surface in the cavity of the socket wrench.

17. The tool of claim 10, wherein the end effector comprises pliers, wherein a first effector feature comprises a first jaw surface, and wherein a second effector feature comprises a first portion of a second jaw surface.

18. The tool of claim 10, further comprising an electronically-actuatable clutch disposed between the handle and the end effector, wherein the clutch is in communication with the electrical circuit, wherein the clutch switches to a disengaged state when the indicator.

19. The tool of claim 10, further comprising a power supply operable to electrically power the electrical circuit, the indicator, and the plurality of sensors.

20. The tool of claim 10, wherein at least one of the plurality of sensors comprises a piezoelectric sensor operable to detect an amount of applied contact force, wherein the indicator is operable to output a fourth indication, and wherein the electrical circuit is further operable to cause the indicator to output the fourth indication upon any of the first or second sensors detecting an amount of applied contact force above a threshold amount of applied contact force.

\* \* \* \* \*